July 10, 1956
J. R. MADEIRA
2,753,981
TRIPPERS FOR BELT CONVEYORS
Original Filed Dec. 23, 1953
3 Sheets-Sheet 1
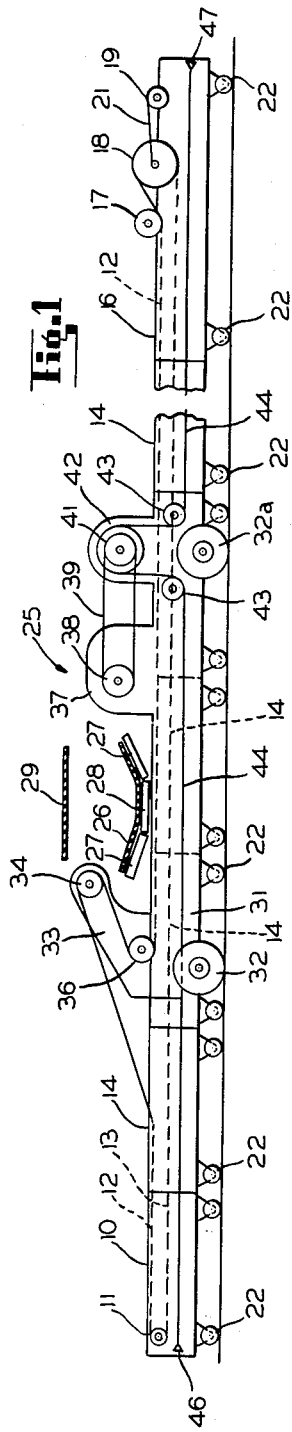
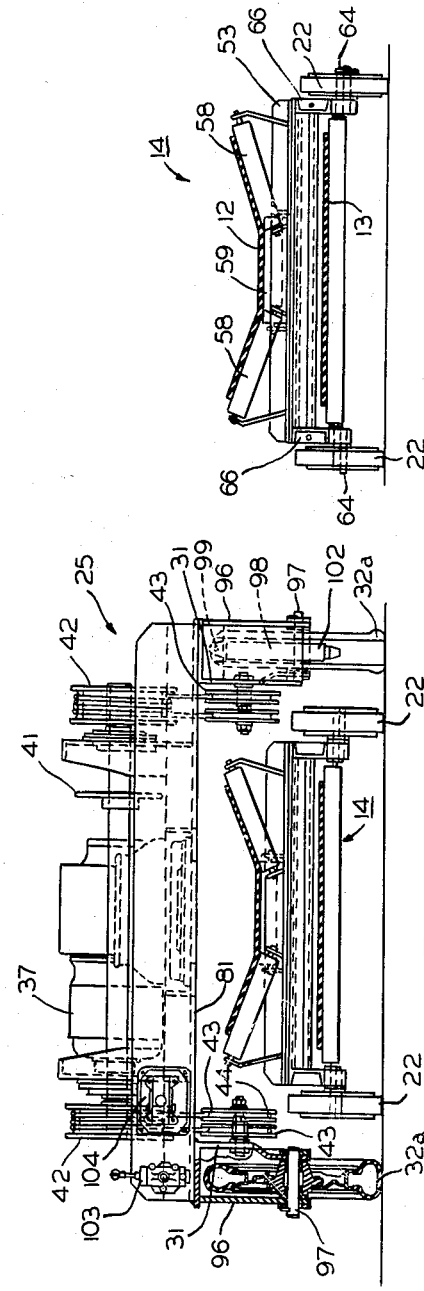
INVENTOR.
JOHN R. MADEIRA
BY
Murray A. Gleeson
ATTORNEY

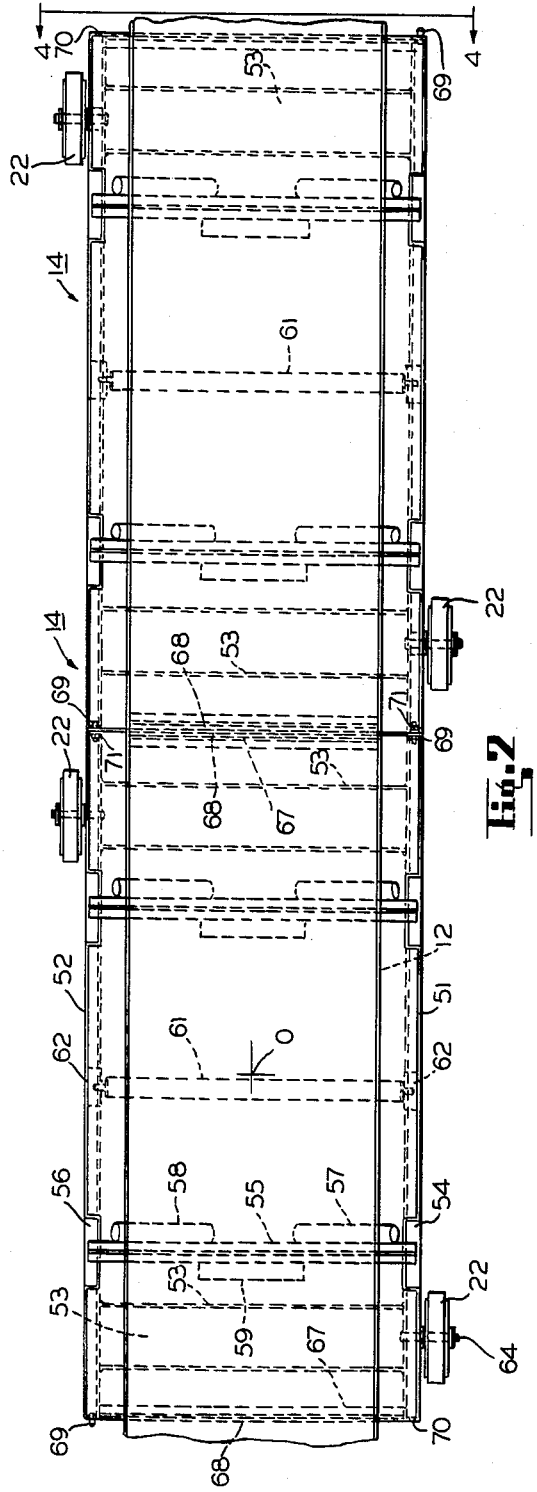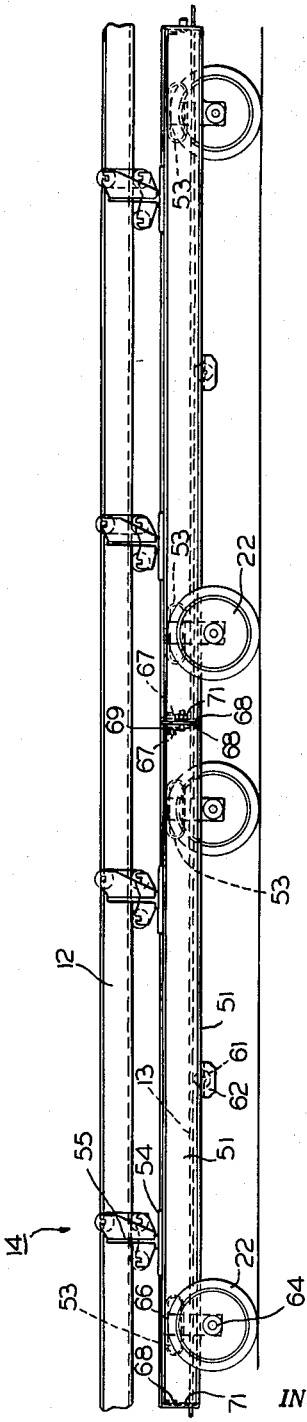

July 10, 1956     J. R. MADEIRA     2,753,981
TRIPPERS FOR BELT CONVEYORS
Original Filed Dec. 23, 1953     3 Sheets-Sheet 3
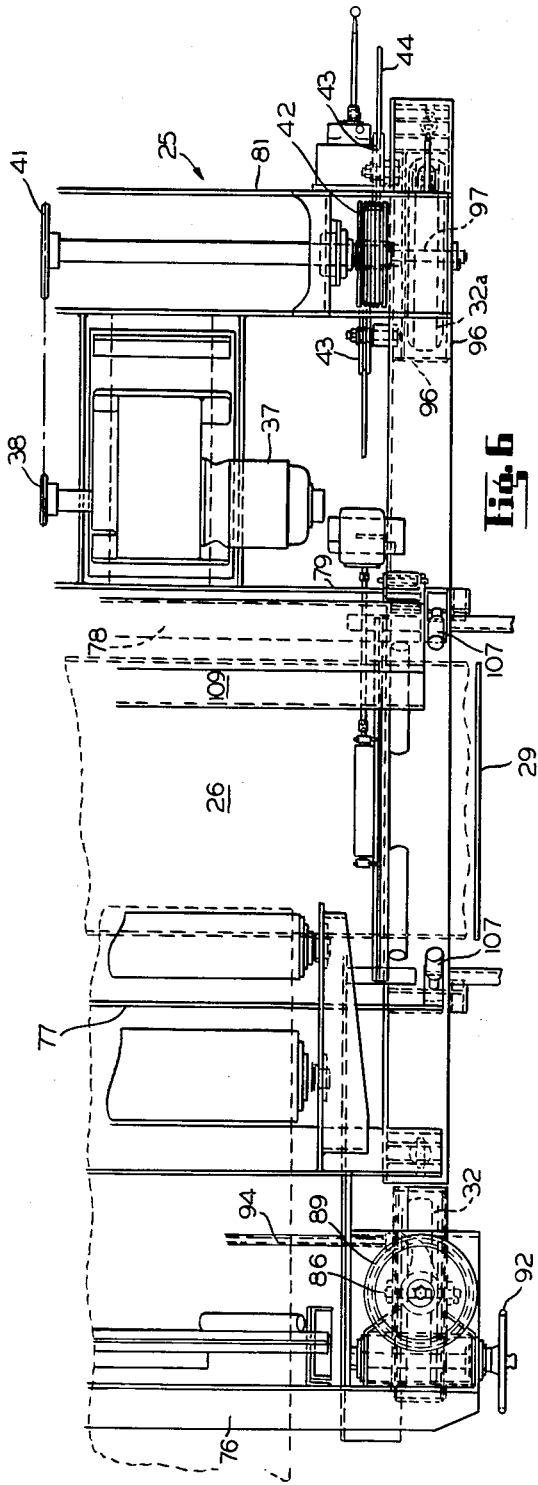
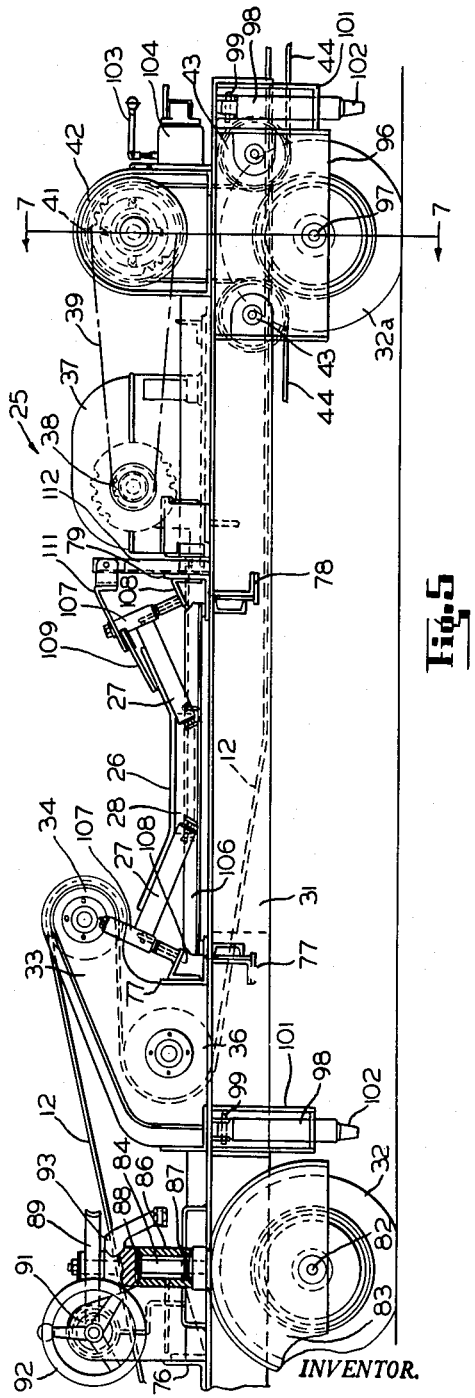
INVENTOR.
JOHN R. MADEIRA
BY
Murray A. Gleeson
ATTORNEY

United States Patent Office 2,753,981
Patented July 10, 1956

2,753,981

TRIPPERS FOR BELT CONVEYORS

John R. Madeira, Chicago, Ill., assignor to Goodman Manufacturing Company, Chicago, Ill., a corporation of Illinois Continuation of application Serial No. 399,933, December 23, 1953. This application April 14, 1955, Serial No. 501,319

13 Claims. (Cl. 198—186)

This invention relates to improvements in apparatus for conveying coal or the like in a mine underground, and more particularly to improvements in apparatus used in connection with continuous miners.

This application is a continuation of my co-pending application Ser. No. 399,933, filed December 23, 1953, and now abandoned.

The continuous mining machines employed in room and pillar mining are able to remove coal from a solid seam at such a rate as to require at least a pair of shuttle cars and a gathering and loading mchine for serving each continuous miner. Consequently all of the advantages of fast production are lost by the expensive equipment and extra labor necessary to serve such a continuous miner.

In my pending application Ser. No. 368,129, filed July 15, 1953, for Apparatus for Mining Coal, there is disclosed an endless flight conveyor which is arranged to move in a room behind a continuous miner, material dislodged by the miner being conveyed by the room conveyor to a conveyor disposed in a cross entry. The room conveyors have been termed in the art as shuttle conveyors since they are provided with means whereby the conveyor may be advanced as the continuous miner advances into the seam.

Such shuttle conveyors are generally of such a length as to extend for the distance between the cross entries of the mine, as is disclosed in the aforesaid application. The shuttle conveyors have also been arranged to co-operate with tripper stations such as are disclosed in a McCarthy application Ser. No. 260,215, filed December 6, 1951, for Automatic Transfer Conveyor. However, at the conclusion of an operation whereby the room has been driven from one cross entry to the next, it has not been heretofore possible readily to advance such a transfer station or tripper to the next cross entry, nor has it been readily possible to advance the shuttle conveyor with respect the tripper as the miner advances into the seam. In such devices of the prior art the operators have been required to operate the power means provided for advancing the shuttle conveyor at a point remote from the continuous miner.

According to the present invention, there is provided an endless belt shuttle conveyor which conveys coal on the upper reach thereof. This endless belt conveyor co-operates with a tripper which straddles the conveyor and which also is arranged to be intersected by a conveyor located in the cross entry, such cross entry conveyor being loaded along the bottom reach thereof, such as disclosed in my aforementioned application.

According to the present invention there is provided a tripper for discharging the contents of the shuttle conveyor onto the bottom loaded cross entry conveyor. Such a tripper is arranged with a power operated winch so that the shuttle conveyor may be advanced by the winch as the continuous miner advances. Conversely, under certain conditions the power operated winch is arranged to move the tripper station with respect to the shuttle conveyor, so that the tripper station may be moved to the next cross entry.

With the foregoing considerations in mind it is a principal object of this invention to provide a new form of tripper station to be used with a shuttle conveyor of a continuous miner, such tripper station being arranged to move with respect to the shuttle conveyor while the shuttle conveyor is maintained in a stationary position, and to be held in a stationary position while the shuttle conveyor is advanced behind the continuous miner.

Other objects and important features of the invention will be apparent from a study of the following specification taken with the drawings which together show a preferred embodiment of the invention, and what is now considered to be the best mode of practicing the principles thereof. Other embodiments of the invention may be suggested to those having the benefit of the teachings herein, and it is therefore intended that such other embodiments be expressly reserved, particularly as they fall within the scope and purview of the appended claims.

In the drawings:

Fig. 1 is a somewhat schematic front elevational view of a shuttle conveyor such as may be used in room and pillar mining behind a continuous mining machine, said figure showing schematically the tripper according to the present invention;

Fig. 2 is a plan view of a pair of intermediate sections of the shuttle conveyor shown in Fig. 1;

Fig. 3 is a front elevational view thereof;

Fig. 4 is an end view of one of the intermediate sections of the shuttle conveyor shown in Figs. 2 and 3, said view being taken along the line 4—4 of Fig. 2 and looking in the direction of the arrows;

Fig. 5 is a front elevational view of a tripper station according to the present invention;

Fig. 6 is a plan view thereof; and

Fig. 7 is a vertical section taken through the tripper station of Figs. 5 and 6, said view being taken along the line 7—7 and looking in the direction of the arrows.

General description

Referring now to Fig. 1 of the drawings, there is shown a schematic front elevation view of a shuttle conveyor and a tripper station according to the present invention. The shuttle conveyor has an inby end 10 forming a support for an idler pulley 11 around which is trained the upper conveying reach 12 and the lower return reach 13 of a conveyor belt.

Intermediate conveyor sections 14 are connected to each other, as will appear as this specification proceeds, for the distance between the cross entries of the mine, and the outby section of such intermediate sections 14 is joined to an outby section 16 including an idler pulley 17 below which the conveyor belt is guided. The upper and lower reaches 12 and 13 of the conveyor belt are trained around a driving pulley 18 having the driving motor therefor enclosed therein.

Driving pulley 18 is mounted upon rails, not shown, and may be adjusted in position by means of a takeup device consisting of a winch 19 and a takeup cable 21.

All of the conveyor belt sections 10, 14 and 16 are mounted upon wheels 22, so that the entire assembly may be moved in the room behind the continuous miner with respect to a tripper station indicated generally by the reference numeral 25.

Such a tripper station is arranged to lift the upper reach of the belt 12 into position for discharge onto a cross entry conveyor which conveys material along a lower reach 26 thereof, such lower reach being supported upon inclined idling rollers 27 and a horizontal load supporting roller 28, the return or nonconveying reach of the belt being indicated by the reference numeral 29.

The tripper station 25 includes spaced frames 31 extending on each side of the intermediate conveyor sections 14. The spaced frames 31 are supported upon steering wheels 32 and upon fixed wheels 32a so that the tripper station can be steered and moved over a mine floor under conditions as will appear.

Each spaced frame 31 includes an upper extension 33 to afford a support for an idler pulley 34. The upper reach 12 of the belt is reversed in direction around the idler pulley 34, and is further reversed in direction upon a lower idler pulley 36 also supported on the spaced frame extensions 33, whence the belt is further supported by the intermediate conveyor sections 14 disposed beneath the tripper 25.

In general, the tripper 25 is arranged to perform two functions.

The first of these functions is when the tripper station is fixed in position and is arranged to move the shuttle conveyor beneath same to advance the shuttle conveyor in accordance with the advance of the continuous miner. The other of these functions is to advance itself from one cross entry to the next while the shuttle conveyor is fixed in position. To this end the tripper 25 is provided with a motor 37 to turn a driving sprocket 38 having a sprocket chain 39 driven thereby. The sprocket chain 39 in turn drives a sprocket 41 of a winch 42 having a rope or cable trained therearound.

A pair of spaced idler sheaves 43 are mounted individually on each frame 31 along the proximate sides thereof and are disposed beneath the winch 42 to guide cables 44, each of the cables 44 extending in a forward direction to an anchor 46 upon the inby section 10 of the shuttle conveyor. Each cable 44 also extends in a rearward direction to be anchored at 47 to the outby conveyor section 16.

Description of intermediate conveyor sections

Referring now particularly to Figs. 2, 3 and 4 of the drawings the intermediate conveyor sections 14 each include spaced channels 51 and 52 which are held in spaced relationship by flattened tubular members 53 welded at their ends to the webs of the channels 51 and 52. T-shaped cross members 55 are welded to plates 54 and 56 in turn welded to the flanges of the channels 51 and 52 and afford a support for inclined troughing rollers 57 and 58 and a load-supporting roller 59 disposed therebetween. Each of the intermediate trough sections 14 is provided with a lower roller 61 for the return reach 13 of the belt, said return roller 61 being mounted upon angle members 62 held to the lower flange of the channel sections 51 and 52.

As shown in Fig. 2, each of the wheels 22 on each intermediate conveyor section is disposed on a side of the section 14 and located preferably symmetrical with respect to a point O of each section. Each such wheel 22 is supported on a stub axle 64 extending outwardly from a support bracket 66 welded to the outer faces of the channel members 51 and 52.

The ends of each conveyor section 14 are provided with angle members 67 which extend between the spaced channel members 51 and 52. These angle members have welded thereto a vertical plate 68 so that sections can be brought into abutting relationship as seen in Figs. 2 and 3.

As has been explained, each of the intermediate trough sections 14 is made symmetrical with respect to the center O so that the sections may be connected in reverse end-to-end relationship. The trough sections 14 are thus connected together by connecting pins 69 which are threaded at their ends to receive a nut 71. The threaded connectors 69 pass through a mating connector hole 70 on the plates 68, and each plate 68 has a connector member 69 and a hole 70 through which the opposite connector member 69 may pass. Such connector members and their holes 70 are also arranged symmetrically with respect to the center O so that the sections may be reversed in relationship if desired.

Description of tripper

Referring now to Figs. 5, 6 and 7 of the drawings, the details of the tripper 25 will now be described. For purposes of simplicity of description, Figs. 6 and 7 are shown without the intermediate trough section 14 disposed beneath the tripper 25.

As seen in Figs' 5, 6 and 7 of the drawings, the spaced frame members 31 are connected in spaced relationship by means of angle members 76 at one end thereof and by intermediate cross channel members 77 and 78, and an angle member 79 and an opposite end support plate 81.

The dirigible wheels 32 are arranged to turn upon an axle 82 supported by a wheel shroud 83. A vertical spindle 84 extends upward from the shroud 83, said spindle 84 turning within a housing 86 upon bearings 87 and 88. The upper end of the spindle 84 is provided with a worm wheel 89 which cooperates with a worm 91 turned by a hand wheel 92. A steering knuckle 93 is secured to the steering spindle 84 and has a tie bar 94 connected thereto to turn the corresponding wheel 32 on the opposite side of the tripper station 25.

The rear wheels 32a of the tripper station 25 are enclosed within fixed wheel shrouds 96 depending from the spaced frames 31, and the wheels 32a turn upon shafts 97 retained in such wheel shrouds.

Means are provided to hold the tripper station 25 in position, and to this end double acting hydraulic cylinders 98 are pin connected at 99 to the spaced frames 31 near the ends thereof. These hydraulic cylinders 98 are retained within guides 101 and have piston members 102 which are arranged to move downwardly to engage the mine floor.

The cylinders 98 are actuated by a control valve 103 connected in a pump and tank circuit shown generally at 104. Upon actuation of the control valve 103 in one direction, the piston members 102 are driven with considerable force into the mine floor, and when the control valve 103 is moved in the opposite direction, the pistons 102 are retracted.

As seen in Figs. 5 and 6, the cross entry conveyor is arranged so that the lower reach 26 thereof is supported upon the inclined troughing rollers 27, 27 and upon a bottom idler roller 28. These troughing rollers 27, 27 and the bottom roller 28 are supported upon an angle member 106 supported upon the spaced frames 31, 31. In order to guide the belt 26 along the troughing rollers 27, 27 inclined guide rollers 107, 107 may be provided. These inclined guiding rollers are mounted upon brackets 108 mounted respectively upon the angle members 77 and 79.

Normally, the discharge by the belt 12 onto the bottom conveying reach of the cross entry conveyor 26 is diverted by an apron 109 held by a bracket 111 to a standard 112 supported on the spaced frames 31.

Under conditions when the continuous miner is advancing into the seam the shuttle conveyor must be advanced behind the miner. Under such condition, the control valve 103 is actuated so as to cause the pistons 102 to engage the mine floor firmly to hold the tripper in position. When the motor 37 is operated the winch 42 is driven in a direction so as to cause the cables 44 driven thereby to move the shuttle conveyor with respect to the fixed tripper station, such movement being generally done in intermittent stages in accordance with the movement of the continuous miner. The shuttle conveyor may thus be advanced with the continuous miner until it has reached the next cross entry.

The cross entry conveyor is then dismantled and the tripper 25 is then advanced along the length of the shuttle conveyor by means of the winch 42 and the rope of cable 44 fixed to the ends of the shuttle conveyor. The cross entry conveyor is once more located as seen in Figs. 5 and 6.

In tramming the tripper 25 from one cross entry to the other it of course may be readily steered by the dirigible wheels 32, and the steering wheel 92.

It will be seen from the foregoing description that there has been provided a novel improvement in tripper stations for continuous mining systems, said tripper station being capable of moving a shuttle conveyor disposed therebeneath while being fixed in position, and being capable of moving with respect to a fixed shuttle conveyor when it is desired to move the tripper station from one cross entry to another.

While the invention has been described in terms of a preferred embodiment thereof it is not intended that the scope of the invention be limited by the embodiment shown and described, nor otherwise than by the terms of the claims here appended.

I claim as my invention:

1. The combination of a conveyor having a frame with ground engaging members for movement of the frame along its longitudinal axis, said conveyor having a conveying reach and a return reach with a tripper arranged to discharge the conveying reach of said conveyor, said tripper comprising a framework overlying said conveyor and straddling same, a pair of idler rollers on said framework around which said conveying reach is trained for discharge thereof, a motor and a winch mounted on said framework, flexible draft means driven by said winch, said draft means being anchored to the first mentioned frame of said conveyor, and means for steering said tripper as said tripper is advanced by said draft means relative to said conveyor.

2. The combination of a conveyor having a support frame movable along its longitudinal axis, said conveyor having a conveying reach and a return reach with a tripper arranged to discharge the conveying reach of said conveyor, said tripper comprising a framework overlying said conveyor and straddling same, a pair of idler rollers on said framework around which said conveying reach is trained for discharge thereof, a motor and a winch mounted on said framework, flexible draft means driven by said winch, said draft means being anchored to the support frame of said conveyor, and means for controlling said motor and winch so that said tripper and the support frame may be moved selectively.

3. The combination of a conveyor having a support frame movable along its longitudinal axis, said conveyor having a conveying reach and a return reach with a tripper arranged to discharge the conveying reach of said conveyor, said tripper comprising a framework overlying said conveyor and straddling same, a pair of idler rollers on said framework around which said conveying reach is trained for discharge thereof, a motor and a winch mounted on said framework, flexible draft means driven by said winch, said draft means being anchored to the support frame of said conveyor, and means for holding said tripper in position so that the support frame of said conveyor may be moved relative to the tripper by said motor and winch.

4. A tripper for a conveyor having a support frame, said conveyor having a conveying reach and a return reach, said tripper comprising a framework mounted upon dirigible wheels straddling said conveyor, a pair of idling rollers disposed on said framework for reversing said conveying reach, power means on said framework, flexible draft means driven from said power means and anchored to the support frame of said conveyor, and means selectively operable for holding said tripper in stationary position while said draft means advances said support frame with respect to said tripper, and for advancing said tripper by said draft means while said support frame is stationary, said means including a winch around which said draft means are trained.

5. A tripper for a conveyor having a support frame, said conveyor having a conveying reach and a return reach, said tripper comprising a framework mounted upon dirigible wheels straddling said conveyor, a pair of idling rollers disposed on said framework for reversing said conveying reach, power means on said framework, flexible draft means driven from said power means and anchored at its ends to said support frame, and means selectively operable for holding said tripper in stationary position while said draft means advances said support frame with respect to said tripper, and for advancing said tripper by said draft means while said support frame is stationary.

6. The combination of a conveyor having a frame with ground engaging members for movement of the frame along its longitudinal axis, said conveyor having a conveying reach and a return reach with a tripper arranged to discharge the conveying reach of said conveyor, said tripper comprising a framework overlying said conveyor and straddling same, means disposed on said framework for effecting discharge of said conveying reach, a motor and a winch mounted on said framework, flexible draft means driven by said winch, said draft means being anchored upon said first mentioned frame, means for holding said tripper in position so that the first mentioned frame of said conveyor may be moved relative to the tripper by said motor and winch, and means for controlling said last-named means so that said tripper may be advanced with respect to said conveyor or maintained in position while said conveyor advances with respect thereto.

7. The combination of a conveyor having a frame with ground engaging members for movement of the frame along its longitudinal axis, said conveyor having a conveying reach and a return reach with a tripper arranged to discharge the conveying reach of said conveyor, said tripper comprising a framework overlying said conveyor and straddling same, means disposed on said framework for effecting discharge of said conveying reach, a motor and a winch mounted on said framework, flexible draft means driven by said winch, said draft means being anchored to the first mentioned frame of said conveyor, and means for steering said tripper as said tripper is advanced by said draft means relative to said conveyor.

8. The combination of a conveyor having a frame with ground engaging members for movement of the frame along its longitudinal axis, said conveyor having a conveying reach and a return reach with a tripper arranged to discharge the conveying reach of said conveyor, said tripper comprising a framework overlying said conveyor and straddling same, means disposed on said framework for effecting discharge of said conveying each, a motor and a winch mounted on said framework, flexible draft means driven by said winch and having its ends anchored to said first mentioned frame, and means for controlling said draft means so that said tripper is held stationary whilst said conveyor is moved relative thereto and vice versa.

9. The combination of a conveyor having a support frame movable along its longitudinal axis, said conveyor having a conveying reach and a return reach with a tripper arranged to discharge the conveying reach of said conveyor, said tripper comprising a framework including means supported by said framework for effecting discharge of said conveying reach, a motor and a winch mounted on said framework, flexible draft means driven by said winch, said draft means being anchored to the support frame of said conveyor, and means for controlling said motor and winch so that said tripper and the support frame may be moved selectively.

10. The combination of a conveyor having a support frame movable along its longitudinal axis, said conveyor having a conveying reach and a return reach with a tripper arranged to discharge the conveying reach of said conveyor, said tripper comprising a framework including means supported by said framework for effecting discharge of said conveying reach, a motor and a winch mounted on said framework, flexible draft means driven by said winch, said draft means being anchored to the support frame of said conveyor, and means for holding said tripper in position so that the support frame of said conveyor may be moved relative to the tripper by said motor and winch.

11. A tripper for a conveyor having a support frame, said conveyor having a conveying reach and a return reach, said tripper comprising a framework mounted upon dirigible wheels straddling said conveyor, means supported by said framework for effecting discharge of said conveying reach, power means on said framework, flexible draft means driven from said power means and anchored to the support frame of said conveyor, and hydraulic operated ground-engaging means selectively operable for holding said tripper in stationary position while said draft means advances said support frame with respect to said tripper, and for enabling said tripper to advance by said draft means while said support frame is stationary.

12. A tripper for a conveyor having a support frame, said conveyor having a conveying reach and a return reach, said tripper comprising a framework mounted upon dirigible wheels straddling said conveyor, power means on said framework, flexible draft means driven from said power means and anchored at its ends to said support frame, and means selectively operable for holding said tripper in stationary position while said draft means advances said support frame with respect to said tripper, and for advancing said tripper by said draft means while said support frame is stationary.

13. A tripper for a conveyor having a support frame, said conveyor having a conveying reach and a return reach, said tripper comprising a framework mounted upon dirigible wheels, means supported on said framework for effecting discharge of said conveying reach, power means, flexible draft means driven from said power means and anchored to said support frame, and means selectively operable for holding said tripper in stationary position while said draft means advances said support frame with respect to said tripper, and for advancing said tripper by said draft means while said support frame is stationary.

References Cited in the file of this patent

UNITED STATES PATENTS

| | | |
|---|---|---|
| 847,309 | Baldwin et al. | Mar. 19, 1907 |
| 2,633,974 | Jackson | Apr. 7, 1953 |